(12) United States Patent
Toskala

(10) Patent No.: US 7,162,244 B1
(45) Date of Patent: Jan. 9, 2007

(54) METHOD FOR TRANSMITTING SIGNALS FROM A PLURALITY OF BASE STATIONS TO A MOBILE STATION

(75) Inventor: Antti Toskala, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/009,355

(22) PCT Filed: Apr. 26, 2000

(86) PCT No.: PCT/EP00/03699

§ 371 (c)(1),
(2), (4) Date: Apr. 4, 2002

(87) PCT Pub. No.: WO00/70785

PCT Pub. Date: Nov. 23, 2000

(30) Foreign Application Priority Data

May 12, 1999 (GB) .............................. 9911084.3

(51) Int. Cl.
H04Q 7/20 (2006.01)
H04Q 7/00 (2006.01)
H04B 7/15 (2006.01)
H04B 1/38 (2006.01)
H04M 1/00 (2006.01)

(52) U.S. Cl. ............ 455/436; 455/422; 455/450; 455/452.2; 455/522; 455/525; 455/561; 370/331; 370/437

(58) Field of Classification Search ............... 455/436, 455/438, 439, 442, 522, 525, 452.2, 561, 455/450; 370/331, 437
See application file for complete search history.

(56) References Cited

U.S. PATENT DOCUMENTS

| | | | | |
|---|---|---|---|---|
| 5,711,004 A | * | 1/1998 | Blasiak et al. | 455/436 |
| 5,809,430 A | * | 9/1998 | D'Amico | 455/525 |
| 6,073,021 A | * | 6/2000 | Kumar et al. | 455/442 |
| 6,085,108 A | * | 7/2000 | Knutsson et al. | 455/522 |
| 6,094,427 A | * | 7/2000 | Yi | 370/331 |
| 6,144,861 A | * | 11/2000 | Sundelin et al. | 455/522 |

(Continued)

FOREIGN PATENT DOCUMENTS

CA      2253379      5/1997

(Continued)

OTHER PUBLICATIONS

Mitts H: "Implications of Marco Diversity on UMTS/B-ISDN Integration", Global Telecommunications Conference (GLOBECOM), US, New York, IEEE, 1996; pp. 1674-1678, XP000748735; ISBN: 0-7803-3337-3 (whole document), no month listed.

*Primary Examiner*—William D. Cumming
(74) *Attorney, Agent, or Firm*—Alfred A. Fressola; Ware, Fressola, Van Der Sluys & Adolphson LLP

(57) ABSTRACT

A method of transmitting signals from a plurality of first stations to the same second station, the method comprising the steps of transmitting first signals comprising a first communication and first associated information from one of the plurality of first stations to the second station; transmitting second signals comprising the first communication, a second communication and second associated information, the second associated information differing at least partially from the first associated information, from another of the plurality of first stations to the second station; and receiving at the second station the first and second signals, wherein the second station processes the first and second signals in accordance with the first and second associated information.

38 Claims, 2 Drawing Sheets

U.S. PATENT DOCUMENTS

| | | |
|---|---|---|
| 6,259,927 B1 * | 7/2001 | Butovitsch et al. ......... 455/522 |
| 6,347,091 B1 * | 2/2002 | Wallentin et al. ........... 370/437 |
| 6,366,778 B1 * | 4/2002 | Bender et al. ............... 455/442 |
| 6,374,112 B1 * | 4/2002 | Widegren et al. ........ 455/452.2 |
| 6,456,860 B1 * | 9/2002 | Nakagaki .................... 455/561 |
| 6,724,813 B1 * | 4/2004 | Jamal et al. ................. 455/450 |

FOREIGN PATENT DOCUMENTS

| | | |
|---|---|---|
| EP | 0577322 | 1/1994 |
| JP | 2000-183812 | 6/2000 |
| WO | WO 95/08897 | 3/1995 |

* cited by examiner

US 7,162,244 B1

METHOD FOR TRANSMITTING SIGNALS FROM A PLURALITY OF BASE STATIONS TO A MOBILE STATION

FIELD OF THE INVENTION

The present invention relates to a transmitting method and in particular, but not exclusively, to a method of transmitting signals from a plurality of base stations to a mobile station in a wireless cellular telecommunications network.

BACKGROUND OF THE INVENTION

The use of code division multiple access (CDMA) is being proposed for the next generation of cellular telecommunication networks.

Additionally, code division multiple access is also being used in the IS-95 Standard in the USA. CDMA is a direct sequence spread spectrum technique. In a wireless cellular network using CDMA, the mobile terminals in one cell associated with a first base station will use the same frequency as mobile stations in an adjacent cell associated with a second base station. The different mobile stations can be distinguished by the respective base stations as each mobile station will be using a different spreading code.

In U.S. Pat. No. 5,101,501 a CDMA system is described which uses "soft" handoff. With soft handoff, a mobile station is capable of communicating with more than one base station at the same time. This will typically occur when the mobile station is close to the boundary defined between two cells. The signals sent by the mobile stations will be received and processed by both of the base stations. Likewise, the mobile station will receive the same signal from the two base stations. The signals from the two base stations may be combined. The combined signal may provide better quality than the individual signals received by the mobile station.

It has also been proposed that two parallel connections be provided between a mobile station and a base station. One of these connections is for speech whilst the other is for data. The soft handoff scenario described hereinbefore has been proposed in the context of speech connections. The use of soft handoff with data is difficult to successfully implement and so it has been proposed that even if the mobile station is in soft handoff with two or more base stations for speech connections, the mobile station should only communicate with a single base station for the data connection.

The inventor has appreciated that this proposal has problems in certain soft handoff situations. These problems will occur when the two base stations with which a mobile station is in communication are under the control of different radio network controllers. The radio network controllers provide control information to the base stations for forwarding to a mobile station. This information indicates if speech and/or data is present and associated rate information. For successful combining in the mobile station when in soft handoff, this information should not contradict. If one base station under the control of one radio network controller indicates that speech and data are being sent to the mobile station and a second base station under the control of a different radio network controller indicates to the same mobile station that only speech is being sent to the mobile station, the mobile station will not be able to successfully combine the received speech. The mobile station may also assume that there is no data information as the mobile station has only been advised that there is data information by one base station. As this information is only received from one base station, the mobile station may assume that the information from the base station is unreliable and that there is in fact no data.

EP-A-0 577 322 describes a method for call handover in a cellular radio system using soft handover, whereby during the transitional period in which the mobile station switches base station, the mobile station is in communication with both base stations on different channels.

SUMMARY OF THE INVENTION

It is an aim of embodiments of the present invention to address this problem.

According to a first aspect of the present invention, there is provided a method of transmitting signals from a plurality of first stations to the same second station, the method comprising the steps of transmitting first signals comprising a first communication and first associated information from one of the plurality of first stations to the; second station transmitting second signals comprising the first communication, a second communication and second associated information, the second associated information differing at least partially from the first associated information, from another of the plurality of first stations to the second station; and receiving at the second station the first and second signals, wherein the second station processes the first and second signals in accordance with the first and second associated information.

The first communication or type of communication may comprise speech. Alternatively, the first communication may comprise any other suitable data. As the first communication is transmitted by two different first stations to the same second station, the second station is in soft handoff with respect to the first communication. The first communications may be provided on dedicated channels. Alternatively, the first communications may be provided on shared channels.

The second communication or type of communication may be data or any other suitable information. The second communication is only provided by one of the first stations to the second station. Accordingly, that second communication is not in a soft handoff situation with respect to the second communication. Preferably, the second communication is provided in a shared channel. Alternatively, a dedicated channel may be provided for the second communication.

The first and/or second associated information may comprise information on the rate of the respective first and second signals. Alternatively or additionally, the first and/or second associated information may comprise information which is required in order to successfully process the received signals. Preferably, the first and/or second associated information may comprise at least one code word. Preferably, a code word is provided for the first communication and a different code word is provided for the second communication.

The first and/or second associated information may comprise first information associated with the first communication and second information associated with the second communication. As mentioned hereinbefore, that first and second information may comprise respective code words. Preferably, the first and second associated information comprises the same information in respect of the first communication.

One of the first and second stations may comprise a base station. Preferably, one of the first and second stations comprises a mobile station. The first stations are preferably base stations and the second station is preferably a mobile station.

In preferred embodiments of the present invention, the first and second stations communicate using the code division multiple access technique. The first and second communications may use different spreading codes.

At least two of the first stations may be connected to different control elements, the control elements defining the first and/or second associated information. These control elements may be radio network controllers.

According to a second aspect of the present invention, there is provided a network comprising a plurality of first stations and a plurality of second stations, each of said first stations being connected to a control element, wherein at least one of said first stations is connected to one control element and at least one of the first stations being connected to a different control element, wherein, in a first mode, when a second station is in communication with a plurality of first stations controlled by the same control element, the first stations transmit identical control information to said second station and, in a second mode, when a second station is in communication with a plurality of first stations which are controlled by a plurality of different control elements, the control information transmitted by said first stations to said second station is different, said control information being used by said second station in said first and second modes to control the processing carried out by the second station in respect of signals received from said plurality of first stations.

The control information may be in accordance with the first coding in the first mode and in accordance with the second coding in the second mode.

The first coding may have a first number of symbols available using a first number of bits and the second coding may have a second number of symbols available using a second number of bits, wherein the first number of symbols is greater than the second number of symbols. The control information may comprise a first number of code words in the first mode and a second number of code words in the second mode, the first number of code words being less than the second number of code words. For example, one code word may be used in the first mode and two or more code words may be used in the second mode.

Preferably, the number of bits defining the or each code word in the first mode is different to that of the or each code word in the second mode. The number of bits in the first mode for a code word is preferably greater than that in the second mode.

BRIEF DESCRIPTION OF THE DRAWINGS

For a better understanding of the present invention and as to how the same may be carried into effect, reference will now be made by way of example to the accompanying drawings in which.

DETAILED DESCRIPTION OF EMBODIMENTS OF THE INVENTION

Figure 1:
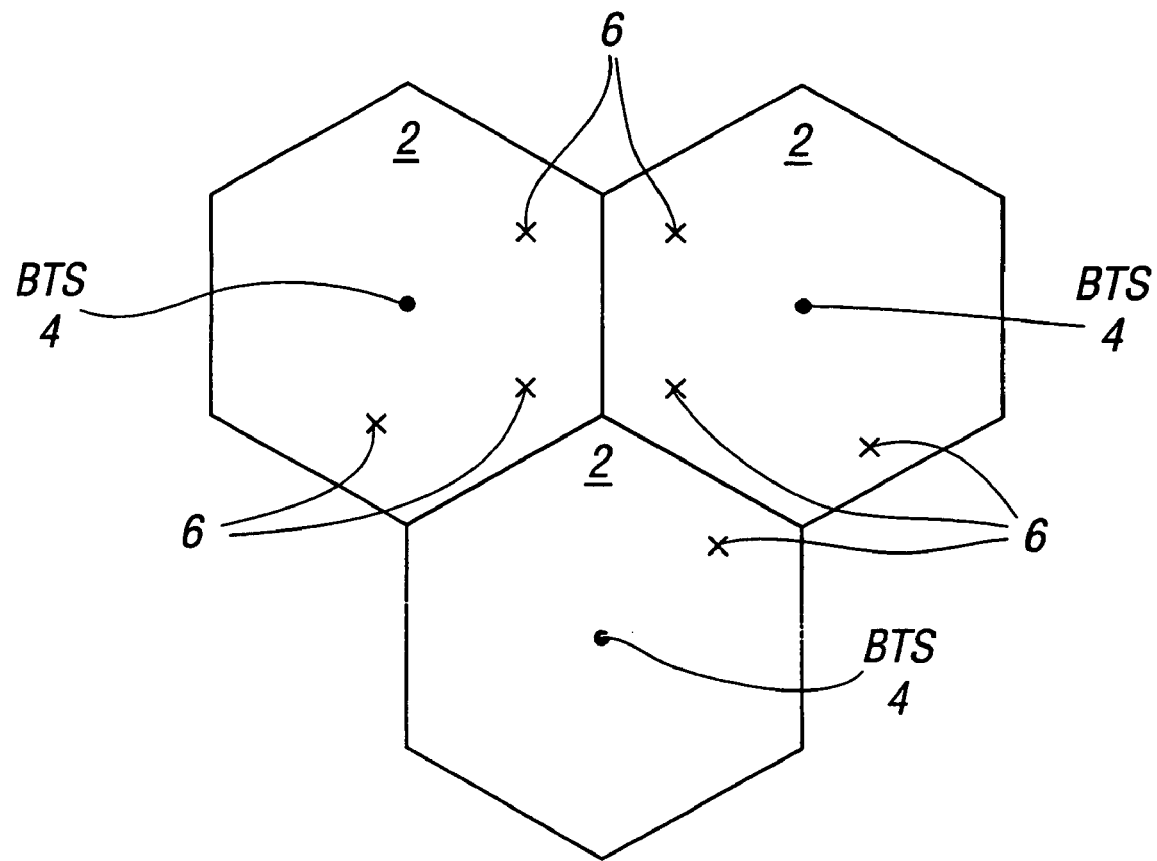
FIG. 1 shows a schematic diagram of part of a cellular telecommunications network incorporating base transceiver stations and mobile stations.

Reference will first be made to FIG. 1 in which three cells 2 of a cellular telecommunications network are shown. Each cell 2 is served by a respective base transceiver station (BTS) 4. Each base transceiver station 4 is arranged to transmit signals to and receive signals from the mobile stations 6 located in the cell associated with the given base transceiver station 4. Likewise, each mobile station 6 is able to transmit signals to and receive signals from the respective base transceiver station 4.

The cellular telecommunications network shown in FIG. 1 uses a code division multiple access technique. Accordingly, at least some of the mobile stations will be in communication with more than one base station at the same time. This, however, will be described in more detail hereinafter.

Figure 2:
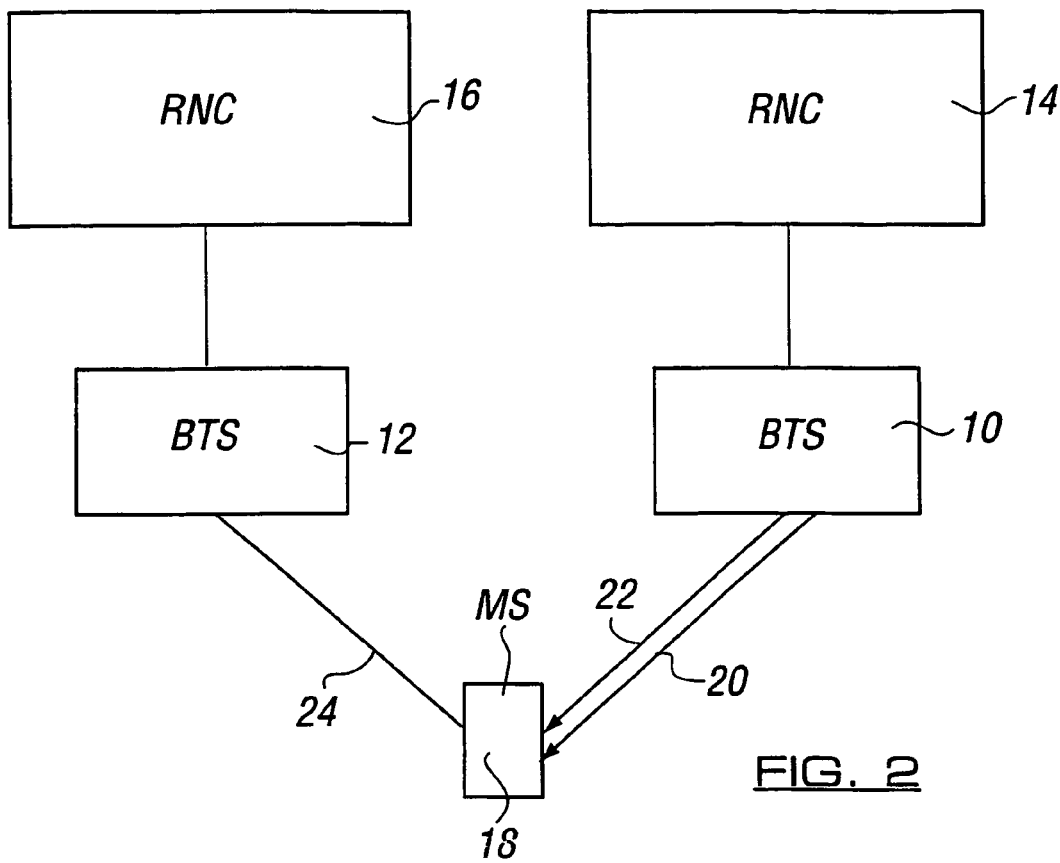
FIG. 2 shows part of the network of FIG. 1 in more detail.

Reference is now made to FIG. 2 which shows two base stations 10 and 12 which serve adjacent cells. The first base station 10 is connected to a first radio network controller 14 whilst the second base station 12 is connected to a second radio network controller 16. In practice each of the first and second radio network controllers 14 and 16 will be connected to more than one base station. However for clarity, only one base station is shown as being connected to each radio network controller.

In the scenario illustrated in FIG. 2, a mobile station 18 is in communication with both the first and the second base stations 10 and 12 at the same time and is therefore in soft handoff. The cells of the first and second base stations can be regarded as overlapping with the mobile station 18 being in the region of overlap.

The mobile station 18 has a downlink speech connection 20 and a downlink data connection 22 with the first base station 10, these connections being in parallel. The speech connections may, but not necessarily be a dedicated connection and is sometimes referred to as a downlink channel. The data connection via these embodiments is a downlink shared channel and is also used by the first base station 10 for other communications with different mobile stations. Alternatively, the data connection may be a dedicated channel. The speech and data connections use different spreading codes so that the two connections (channels) can be distinguished. The spreading factor (i.e. processing gain) may also differ for the speech and data connections.

Control information for the mobile station 18 from the first base station 10 is multiplexed with the speech on the speech connection and therefore uses the same code as the speech connection.

The mobile station 18 has a downlink speech connection 24 with the second base station 12 and no data connection. The speech connection 24 between the mobile station 18 and the second base station 12 uses the same spreading factor as the speech connection between the first base station 10 and the mobile station 18. Once again, the control information will be multiplexed with speech on the speech connection and a single spreading code is used. The speech connection may be regarded as a dedicated physical data channel whilst the control information may be regarded as being provided by a dedicated physical control channel.

Whilst the speech information transmitted by the first and second base stations 10 and 12 to the mobile stations is the same, the control information may be the same or different. The control information includes information such as power control information for controlling the power with which the mobile station 18 transmits. The control information also includes TFCI information as will be discussed hereinafter. The control information may include pilot signals or symbols which act as a reference for certain purposes.

The control information is time multiplexed onto the speech channel (i.e. the dedicated downlink physical channel) and thus uses the same spreading code.

Data blocks are transmitted between the radio network controllers 14 and 16 and the respective base stations 10 and 12 using a frame protocol FP. The data may be speech or conventional data. A frame contains data which is to be transmitted in one interleaving period and a transport format indicator TFI. The interleaving period is the period over which data is interleaved. The transport format indicator TFI provides information as to the format of the data frame such as the size of the data block, the interleaving period and the like.

Each mobile station has an independent transport connection which means that each frame contains the data and current transport format indicator TFI of one bearer only. One bearer is the speech, another bearer is the data and yet another bearer is the signalling. For downlink communications (from the radio network controller to the base station direction), the data blocks of users having the same user equipment are multiplexed onto a single radio link. The manner in which the multiplexing is done will depend on the transport format indicator TFI of each frame which indicates the amount of data in each frame for the bearers. The multiplexing takes place with the blocks which are to use the same spreading code.

A transport format combination information TFCI field of the radio frame provided in a dedicated physical control channel DPCCH will indicate the manner in which the multiplexing is carried out. The transport format combination information TFCI field will indicate the transport format indicator TFI for each of the bearers whose data is multiplexed in the radio frame or frames in the dedicated physical data channel DPDCH. Each frame incorporates two code slots, one for shared channels and one for the unshared channels. The TFCI information provides information on the rate associated with the speech and data respectively.

The rate information thus defines the interleaving performed as well as the form of channel coding.

When the mobile station 18 is in communication with two base stations 10 and 12 which are controlled by different radio network controllers 14 and 16, the TFCI coding is modified as follows. A first type of coding is used for the TFCI coding in this scenario. In this embodiment 16.5 coding is used. This means that there are 16 possible symbols which are represented by 5 bits.

Figure 3:
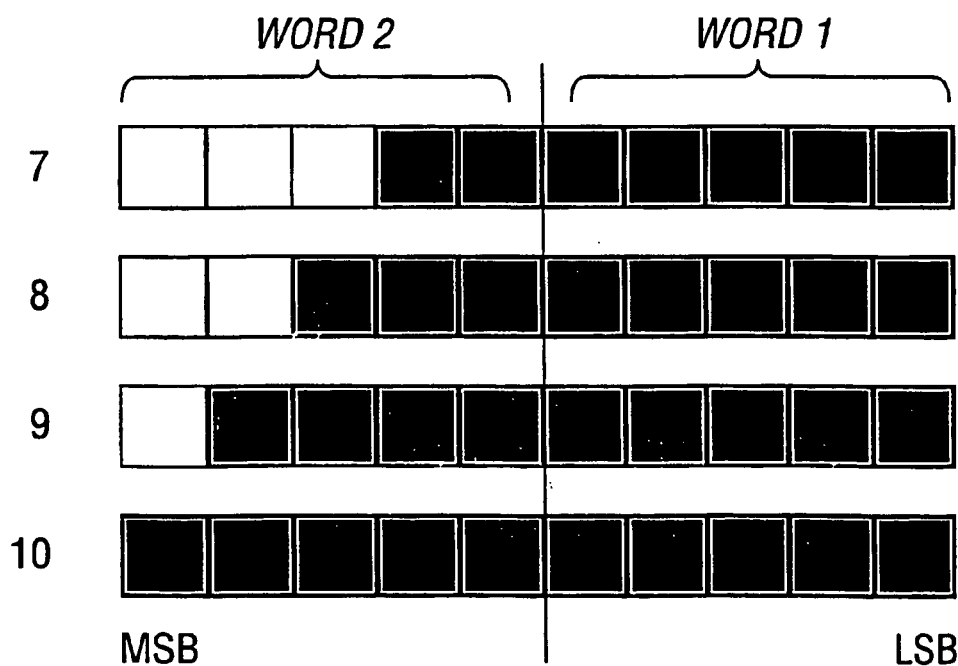
FIG. 3 illustrates the coding used in embodiments of the present invention.

Each of the base stations will send one or two code words, each having a maximum length of 5 bits. These code words are formulated by the respective radio network controller. Reference is made to FIG. 3 which shows four examples of the two words which are received by the mobile station. The first word, WORD 1, is transmitted by both the first base station 10 and the second base station and relates to the speech connection. The same information WORD 1 for the speech connections will be sent to the mobile station 18 from the first and second base stations 10 and 12. This is because the same speech information is sent to the mobile station from both the first and second base stations 10 and 12.

A second word WORD 2 relates to any data connection. The first base station 10 sends WORD 2 to the mobile station 18. As there is no data connection between the second base station and mobile station 18 one of the following occurs: instead of a second code word, WORD 2, the second base station sends a series of zeros or the like, representing the second word. Alternatively, the second base station may not send the second word WORD 2. Accordingly, the mobile station may only receive one version of the second code word, WORD 2 from the first base station or a second version with zeros or the like. In the latter case, the two second words WORD 2 can be combined so the effects of the connection where there is no data are ignored. This may be used to confirm that there is only one data connection.

The first word contains the TCFI information for the speech connection between the first base station 10 and the mobile station 18 and between the second base station 12 and the mobile station 18. The TCFI information is the same from both the first and the second base stations.

The second word contains TCFI information for the data connection between the first base station 10 and the mobile station 18. There is no TCFI information from the second base station 12 for a data connection.

FIG. 3 shows examples where the total number of TFCI bits received by the mobile station is 7, 8, 9 and 10. As can be seen from these examples, it is not necessary to use all of the available bits of each code word. For example, in one version of the second word, WORD 2, all bits are used, in another four bits, in another three bits and in another two bits. Only one bit may also be used. The position of the unused bit or bits may vary. The first word, WORD 1 may vary. The first word, WORD 1 may similarly use only some of the available bits.

The mobile station uses the TCFI information in order to process the speech and data connections as required. For example, the rate information may mean the speech or data has been interleaved and encoded in a certain manner. The mobile station uses the rate information to determine the deinterleaving process and decoding to be carried out.

Where the mobile station is in communication with two base stations which are controlled by the same radio network controller, the mobile station receives the same TCFI information from both of the base stations for each connection. The TCFI information will use a different coding. In this embodiment the different coding will be 32.6 coding. This means that there are 32 possible symbols which are represented by 6 bits. There is of course only a single code word of six bits which is transmitted by each of the base stations.

In alternative embodiments of the present invention, other types of coding can be used.

Embodiments of the present invention have the advantage that where two radio network controllers are involved, one of which controls the downlink channel and the other of which controls the downlink shared channel, the benefits of fast signalling on the downlink shared channel can be retained even where the radio network controllers are in different locations.

The data connection TCFI code word (which may be in respect of a shared channel) will not have the gain associated with soft handoff but this also applies to the data itself.

This method described with reference to FIG. 3 has the advantage that a control loop between radio network controllers is not required, reducing traffic in the network.

The signalling information i.e. the TCFI information relating to the speech connection will have the same soft handoff gain associated with the speech connection.

There is an alternative solution to the problem where different base stations which are in communication with the same mobile station and the base stations are controlled by different radio network controllers. That solution is to connect the two radio network controllers to each other so that the same TCFI coding is sent by both of the base stations. This solution may be advantageous where the radio network controllers are in the same location. If the radio network controllers are not in the same location, this solution may be disadvantageous in that a delay is introduced. This delay is a result of the time taken for the two radio network controllers to signal to each other before transmission can begin.

In one embodiment of the present invention the method described in relation to FIG. 3 is used if the radio network controllers are not in the same location whilst the alternative method is used if the radio network controllers are in the same location. In other embodiments the method described in relation to FIG. 3 is used regardless of the location of the radio network controllers in question.

The format described hereinbefore is part of the currently proposed UMTS (universal mobile telephone service) standard. It should be appreciated that any other standard can alternatively be used.

The control information can in alternative embodiments of the present invention be sent on a separate connection or channel to the speech data.

In alternative embodiments of the present invention, the speech may be replaced by any other suitable form of communication. In other words, any other suitable communication type including some data connections may be in soft handoff as required and used in embodiments of the invention. Likewise, the data can be replaced by any other suitable form of communication, where soft handoff is not desirable. The data may be packet data or any other type of data.

It is also possible that the dedicated channel is only maintained to support handover or the like and only contains signalling information. In this case the first word WORD 1, would refer to the existence of the higher level control information.

In some embodiments of the present invention, the mobile station may be in communication with more than two base stations at the same time. The principles outlined hereinbefore can also be used in this scenario. Each base station can be connected to a different radio network controller. Alternatively, one or more of the radio network controllers can be connected to more than one base station which is in communication with the same mobile station.

Whilst preferred embodiments have been described in the context of a code division multiple access system, embodiments of the present invention can be used with any other spread spectrum technique or any other suitable access technique such as time division multiple access, frequency division multiple and space division multiple access as well as hybrids thereof.

The invention claimed is:

1. A method of transmitting signals from a plurality of base stations to the same mobile station in handoff, said method comprising the steps of:
    transmitting first signals comprising a first communication and a first associated information from one base station of said plurality of base stations to said mobile station;
    transmitting second signals comprising said first communication and a second communication and a second associated information, said second associated information differing at least partially from said first associated information, from another base station of said plurality of base stations to said mobile station; wherein said second communication is only transmitted from said another base station of said plurality of base stations; and
    receiving at said mobile station said first and second signals, wherein said mobile station processes said first and second signals in accordance with the first and second associated information so as to be able to receive both the first communication and the second communication.

2. A method as claimed in claim 1, wherein said first communication comprises speech.

3. A method as claimed in claim 1, wherein said first communication comprises signalling information only.

4. A method as claimed in claim 1, wherein said first communication is provided on dedicated channels.

5. A method as claimed in claim 1, wherein said second communication is data.

6. A method as claimed in claim 1, wherein said second communication is provided in a shared channel.

7. A method as claimed in claim 1, wherein said first and/or said second associated information comprise information on a rate concerning interleaving of speech and data of the respective first and second signals.

8. A method as claimed in claim 1, wherein said first and/or said second associated information comprise at least one code word.

9. A method as claimed in claim 1, wherein said first and/or said second associated information comprises first information associated with the first communication and second information associated with the second communication.

10. A method as claimed in claim 1, wherein first and second associated information comprise the same information with respect to the first communication.

11. A method as claimed in claim 1, wherein said base and said mobile stations communicate using a code division multiple access technique.

12. A method as claimed in claim 11 wherein said first and second communications use different spreading codes.

13. A method as claimed in claim 1, wherein at least two of said base stations are connected to different control elements, said control elements defining the first and/or second associated information.

14. A method as claimed in claim 13, wherein said elements comprise radio network controllers.

15. A network comprising a plurality of first stations and a plurality of second stations, each of said first stations being connected to a control element, wherein at least one of said first stations is connected to one control element and at least one of the first stations being connected to a different control element, wherein, in a first mode, when a second station is in communication on a dedicated channel with a plurality of first stations controlled by the same control element the first stations transmit identical control information, which is coded, to said second station and, in a second mode, when a second station is in communication on a shared channel with a plurality of first stations which are controlled by a plurality of different control elements, control information, which is coded, is transmitted by said first stations to said second station, wherein the coded control information of said plurality of first stations controlled by a plurality of different control elements is coded differently than the coded control information controlled by the plurality of first stations controlled by the same control element.

16. A network as claimed in claim 15, wherein said control information being used by said second station in said first and second modes is to control the processing carried out by the second station in respect of signals received from said plurality of first stations.

17. A network as claimed in claim 15, wherein said control information is in accordance with a first coding in the first mode and in accordance with a second coding in the second mode.

18. A network as claimed in claim 17, wherein said first coding has a first number of symbols available using a first number of bits and said second coding has a second number of symbols available using a second number of bits, wherein said first number of symbols is greater than said second number of symbols.

19. A network as claimed in claim 15, wherein the control information comprises a first number of code words in the first mode and a second number of code words in the second mode, said first number of code words being less than said second number of code words.

20. A network as claimed in claim 19, wherein the number of bits defining the or each code word in the first mode is different to that of the or each code word in the second mode.

21. A method of transmitting signals from a plurality of first stations to the same second station, said method comprising the steps of:
transmitting first signals including a first associated information on a dedicated channel from one of said plurality of first stations to said second station wherein said first signals are coded;
transmitting second signals including a second associated information on a shared channel, differing at least partially from said first associated information from another of said plurality of first stations to said second station, wherein said second signals are coded, and further wherein the coding of the second signals differs from the coding of said first signals so that said second signals at least partially differ from said first signals; and
receiving at said second station said first and second signals, wherein said second station processes said first and second signals in accordance with the first and second associated information.

22. A method of transmitting signals from a plurality of base stations to the same mobile station in handoff, said method comprising the steps of:
transmitting first signals comprising a first communication of a first type and a first associated information from one base station of said plurality of base stations to said mobile station;
transmitting second signals comprising said first communication, and a second communication of a second type and a second associated information, said second associated information differing at least partially from said first associated information, from another base station of said plurality of base stations to said mobile station; wherein said second communication is only transmitted from said another base station of said plurality of base stations; and
receiving at said mobile station said first and second signals, wherein said mobile station processes said first and second signals in accordance with the first and second associated information so as to be able to receive both the first communication and the second communication.

23. A method as claimed in claim 22, wherein the first communication of said first type is a voice type communication and wherein the second communication of said second type is a data type communication.

24. A method as claimed in claim 23, wherein the mobile station is in soft handoff with respect to said first communication of said first type and is not in soft handoff with respect to said second communication of said second type.

25. A method as claimed in claim 24, wherein the first communication of said first type is provided on a dedicated channel by said one base station and by said another base station.

26. A method as claimed in claim 25, wherein the second communication of said second type is provided on a shared channel by said another base station.

27. A method as claimed in claim 26, wherein the first associated information comprises a code word and the second associated information comprises at least two code words.

28. A method as claimed in claim 27, wherein the second associated information comprises a first code word related to the first communication and a second code word related to the second communication.

29. A method as claimed in claim 28, wherein the plurality of base stations and the mobile station communicate to each other using a code discussion multiple access technique.

30. A method as claimed in claim 29, wherein spreading codes for the first and second communications are different.

31. A method as claimed in claim 28, wherein the step of the mobile station processing said first and second signals in accordance with the first and second associated information includes the processing of the first associated information code word and the second associated information first and second code words.

32. A method as claimed in claim 31, wherein the code word of the first associated information and the first code word of the second associated information are processed with the second code word of the second associated information so as to allow the speech type communication received from said one base station and said another base station to be combined and to allow the data type communication to be received by the mobile station.

33. A method as claimed in claim 32, wherein the code words of the first and second associated information contain transport format combination information.

34. A method as claimed in claim 22, wherein the first associated information comprises a code word and the second associated information comprises at least two code words.

35. A method as claimed in claim 34, wherein the second associated information comprises a first code word related to the first communication and a second code word related to the second communication.

36. A method as claimed in claim 35, wherein the step of the mobile station processing said first and second signals in accordance with the first and second associated information includes the processing of the first associated information code word and the second associated information first and second code words.

37. A method as claimed in claim 36, wherein the code word of the first associated information and the first code word of the second associated information are processed with the second code word of the second associated information so as to allow the speech type communication received from said one base station and said another base station to be combined and to allow the data type communication to be received by the mobile station.

38. A method as claimed in claim 37, wherein the code words of the first and second associated information contain transport format combination information.

* * * * *